United States Patent
Husarik

[19]

[11] Patent Number: 5,963,198
[45] Date of Patent: Oct. 5, 1999

[54] LOW-COST USER INTERFACE FOR REFRIGERANT RECYCLING MACHINE

[75] Inventor: Roger L. Husarik, Bartlett, Ill.

[73] Assignee: Snap-on Technologies, Inc., Lincolnshire, Ill.

[21] Appl. No.: 08/773,223

[22] Filed: Dec. 23, 1996

[51] Int. Cl.⁶ .................................................. G09G 5/00
[52] U.S. Cl. .................... 345/172; 345/145; 345/156
[58] Field of Search ........................ 345/172, 7, 168, 345/145, 156, 173; 340/825.06, 514; 364/188

[56] References Cited

U.S. PATENT DOCUMENTS

| | | | |
|---|---|---|---|
| 3,821,525 | 6/1974 | Eaton et al. | 364/474.07 |
| 4,385,291 | 5/1983 | Piguet | 340/712 |
| 4,800,378 | 1/1989 | Putrow et al. | 345/10 |
| 4,977,310 | 12/1990 | Studer et al. | 235/375 |
| 5,121,113 | 6/1992 | Kedge et al. | 340/712 |
| 5,161,535 | 11/1992 | Short et al. | 340/712 |
| 5,221,838 | 6/1993 | Gutman et al. | 235/379 |
| 5,224,861 | 7/1993 | Glass et al. | 434/35 |
| 5,418,760 | 5/1995 | Kawashima et al. | 368/69 |
| 5,420,606 | 5/1995 | Begum et al. | 345/156 |
| 5,424,524 | 6/1995 | Ruppert et al. | 235/462 |
| 5,428,341 | 6/1995 | Takahashi et al. | 340/506 |
| 5,438,180 | 8/1995 | Esisenbrandt et al. | 219/492 |
| 5,440,325 | 8/1995 | Edmark, III | 345/145 |
| 5,450,316 | 9/1995 | Gaudet et al. | 364/184 |
| 5,508,500 | 4/1996 | Martin et al. | 235/381 |
| 5,508,947 | 4/1996 | Sierk et al. | 364/571.01 |
| 5,515,267 | 5/1996 | Alsenz | 364/188 |
| 5,533,359 | 7/1996 | Muston et al. | 62/292 |
| 5,564,285 | 10/1996 | Jurewicz et al. | 62/127 |

*Primary Examiner*—Edward Lefkowitz
*Assistant Examiner*—Davetta Woods
*Attorney, Agent, or Firm*—Emrich & Dithmar

[57] ABSTRACT

A refrigerant recovery and/or recycling system includes fluid flow control mechanism controlling the flow of refrigerant between a refrigerant containing structure and an associated refrigeration unit, under the control of a microprocessor-based control circuit. The system has a text-based display screen and selective input keys including software-definable keys respectively associated with different regions of the display screen and respectively associated therewith by indicia on the screen bezel. Memories are coupled to the control circuit for cooperation therewith to control the display of messages on the display screen and for defining functions performed by the software-definable keys in accordance with the corresponding messages displayed on the display screen.

16 Claims, 2 Drawing Sheets

LOW-COST USER INTERFACE FOR REFRIGERANT RECYCLING MACHINE

BACKGROUND OF THE INVENTION

1. Field of the Invention

The present invention relates to refrigerant handling systems and, in particular, to the user interface for such systems. The invention relates specifically to user interfaces which include a display screen and selective input keys.

2. Description of the Prior Art

Many types of user interfaces for automatically operating devices are well known in the art, including interfaces which incorporate a display screen and user-operable input keys. Some systems have display screens which display only status of the system, while others are interactive in that they prompt and respond to user actions, including actuation of the selective input keys. Interactive display screens typically include a plurality of dots or pixels which are independently controllable for displaying a wide variety of alphanumerical or graphical images. Such display screens are typically CRT displays, although other types of displays, such as LCD displays are commonly used. In some of these interactive display screens, certain ones of the selective input keys are software definable keys or "soft keys". Such keys are typically disposed respectively immediately adjacent to different regions of the display screen, and the function of the key varies with the message displayed in the associated screen region.

Non-interactive display screens can be of simplified construction, since they are commonly used to display only a few characters or lines of text. For these applications, text-based display screens have been used, since they are of very simple and economical construction. Interactive display screens, on the other hand, are typically of much more expensive and complicated CRT or LCD type, which offer much greater flexibility in the types of messages or graphical material which can be displayed. Text-based display screens have not been used in interactive applications because of their limited capabilities and because they are typically provided on a dedicated circuit board which has a wide margin around the display screen and, therefore, prevents the positioning of keys, such as soft keys, closely adjacent to the display screen.

SUMMARY OF THE INVENTION

It is a general object of the invention to provide an improved user interface which avoids the disadvantages of prior interfaces while affording additional structural and operating advantages.

An important feature of the invention is the provision of a user interface including an interactive display screen with software-definable keys associated therewith, which is of simple and economical construction.

In connection with the foregoing feature, another feature of the invention is the provision of a user interface of the type set forth, which utilizes a text-based display screen.

Yet another feature of the invention is the provision of a refrigerant handling apparatus incorporating a user interface of the type set forth.

Certain one of these and other features of the invention may be attained by providing a user interface for refrigerant handling apparatus adapted for use with a vehicle air conditioning system and including a microprocessor-based control circuit operable under stored program control, the user interface comprising: a text-based display screen having plural character blocks for respectively displaying only individual characters, selective input keys including plural software-definable keys respectively associated with different regions of the display screen, and memory means coupled to the control circuit for cooperation therewith to control the display of messages on the display screen and to define the functions performed by the software-definable keys in accordance with messages displayed in the corresponding regions of the display screen.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
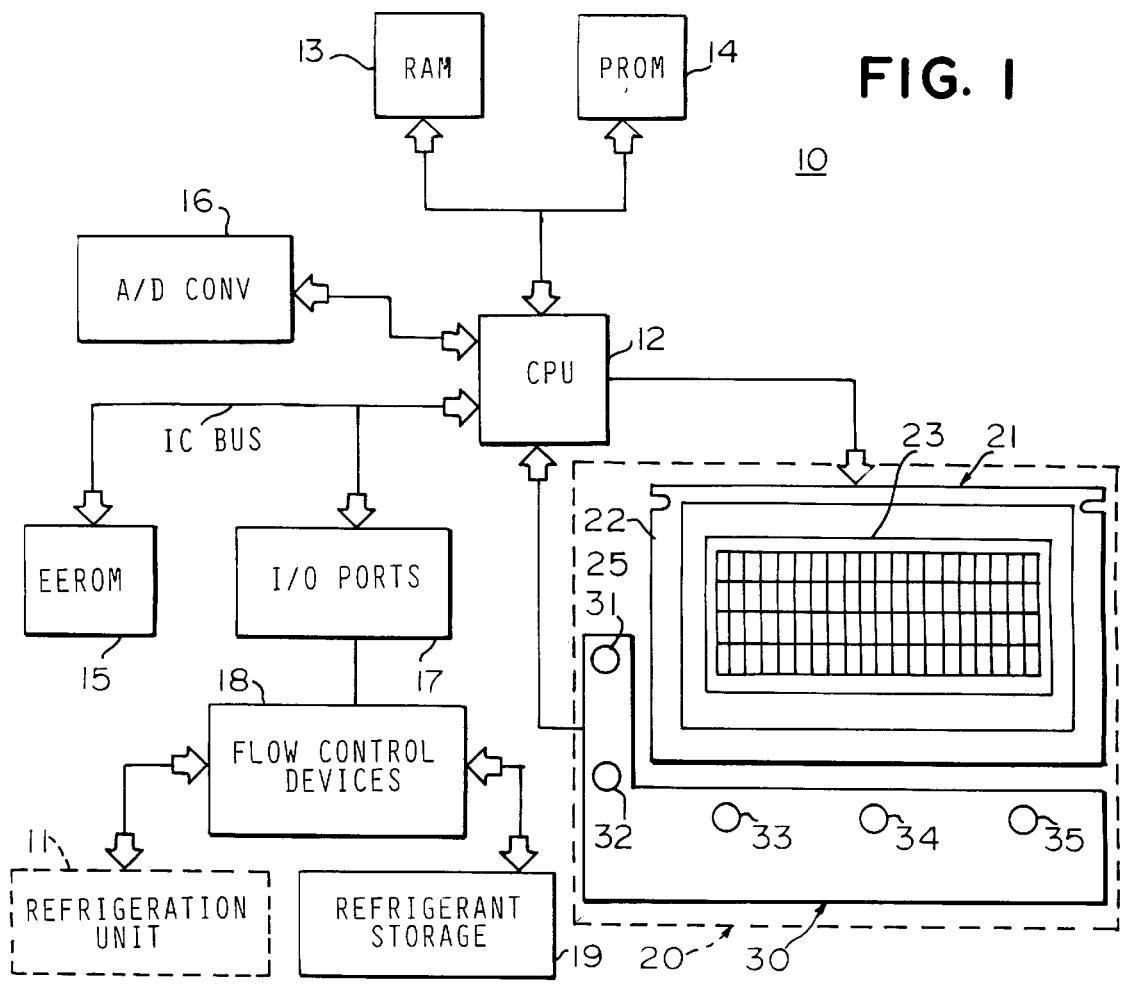
FIG. 1 is a partially block and partially schematic diagram of a refrigerant handling system in accordance with the present invention.

Referring to FIG. 1, there is illustrated a refrigerant handling system, generally designated by the numeral 10, in accordance with the present invention. The refrigerant handling system 10 is designed for handling refrigerant from an associated refrigeration unit 11, which may be an air conditioning system on an automotive vehicle. The system 10 is typically a refrigerant recycler which collects refrigerant from the refrigeration unit 11, recycles it and then recharges it to the refrigeration unit 11. The refrigerant handling system 10 has a central processing unit ("CPU") 12 which may be a microprocessor, and is also provided with a RAM memory 13, a PROM memory 14 and an EEROM memory 15, as well as an analog-to-digital converter (ADC) 16 and associated input/output (I/O) ports 17, all connected to the CPU 12 by suitable buses. The I/O ports 17 are coupled to flow control devices 18. The flow control devices 18, are coupled by suitable conduits to the refrigeration unit 11 and to a refrigeration storage structure 19, for controlling the flow of refrigerant therebetween. In this regard, the refrigerant storage structure 19 may include one or more refrigerant vessels, while the flow control devices 18 may include suitable valves, pumps, compressor, condenser and other refrigerant recycling devices, all in a well-known manner.

Figure 2:
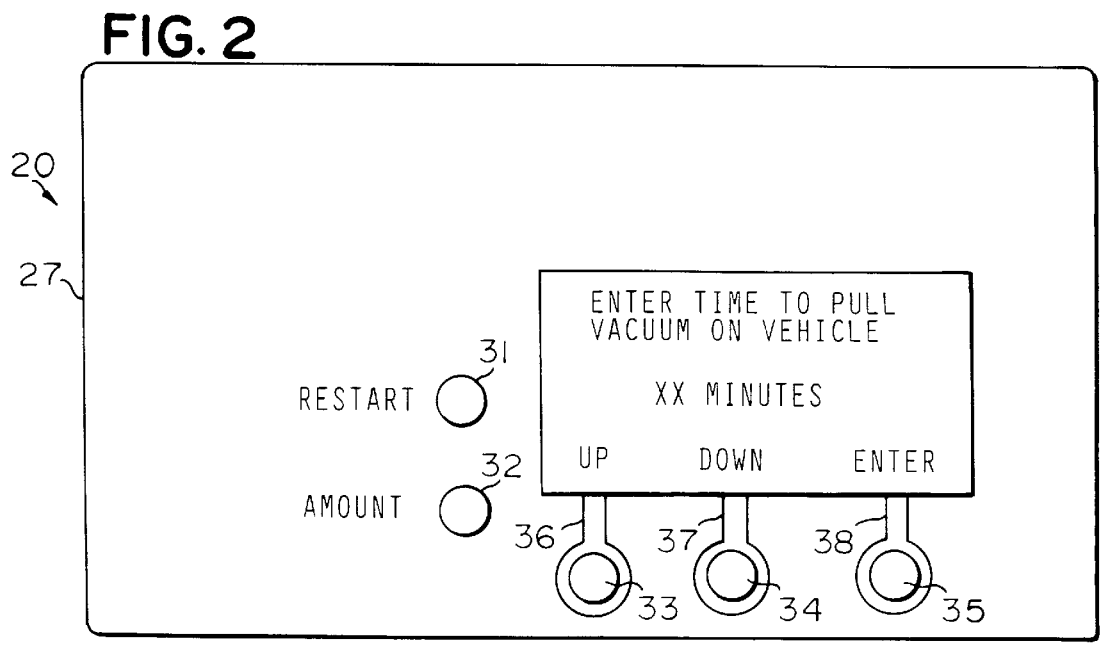
FIG. 2 is a front elevational view of the control panel of the refrigerant handling system of FIG. 1.

Referring also to FIG. 2, the system 10 further includes a control panel 20, which is also coupled to the CPU 12 by suitable buses. The control panel 20 includes a text-based display unit 21, which may be of a commercially-available type, and includes a printed circuit board 22 on which is mounted an LCD display screen 23, and which is provided along one edge with a plurality of connection terminals 24. The screen 23 is preferably rectangular in shape and includes a plurality of character blocks 25 arranged in four horizontal rows of 20 blocks each. Each block 25 includes a plurality of dots or pixels arranged in a grid, each block 25 being separated from adjacent blocks by at least one row of pixels. For example, each character block 25 may include 40 pixels arranged in a 5×8 grid. It will be appreciated that the display unit 21 is driven by a suitable hardware character driver (not shown) so that each character block 25 displays only a single character. In the preferred embodiment, the bottom row of character blocks 25 includes 3 regions, viz., a left-hand region 26A, a center region 26B and a right-hand region 26C for a purpose to be explained more fully below. The display unit 21 may be provided with a suitable bezel 27 (FIG. 2) which covers all of the printed circuit board 22 except for the display screen 23. As can be seen from FIG. 1, the circuit board 22 is so arranged that it extends well beyond the edges of the display screen 23 so as to define a wide margin therearound, the margin being widest along the lower edge of the screen 23.

The control panel 20 also includes a plurality of keys arranged on a keyboard 30. Preferably, the keys include two fixed-function keys 31 and 32 spaced apart vertically along the left-hand side of the display unit 21, and three software-definable or soft keys 33, 34, and 35 aligned in a horizontal row along the bottom edge of the display unit 21, respectively vertically aligned with the regions 26A–C thereof. Referring to FIG. 2, it is a significant aspect of the invention that there are provided on the bezel 27 indicium lines 36, 37 and 38, respectively extending from keys 33–35 to the corresponding ones of the regions 26A–C. This serves to facilitate association of the soft keys 33–35 with the display screen regions 26A–C, which might otherwise be unclear because of the relatively large distance between the keys and the screen necessitated by the printed circuit board margin around the screen 23.

It will be appreciated that the functions of the soft keys 33–35 vary with the messages displayed on the display screen 23 and, in particular, in the regions 26A–C of the bottom row of character blocks 25. For example, referring to FIG. 2, the message displayed in the first two rows of the display screen 23 directs the user to "Enter time to pull vacuum on vehicle:", while the third row displays "xx minutes", indicating the number of minutes to two digits. The bottom row respectively displays "UP", "DOWN" and "ENTER" in the regions 26A–C. Thus, actuation of the soft key 33 is used to increment the number of minutes displayed on the screen, while the soft key 34 is used decrement the number of minutes. When the desired number of minutes has been selected, the soft key 35 is actuated to enter that number into the system. For other screen displays, the soft keys 33–35 may have other functions.

Figure 3:
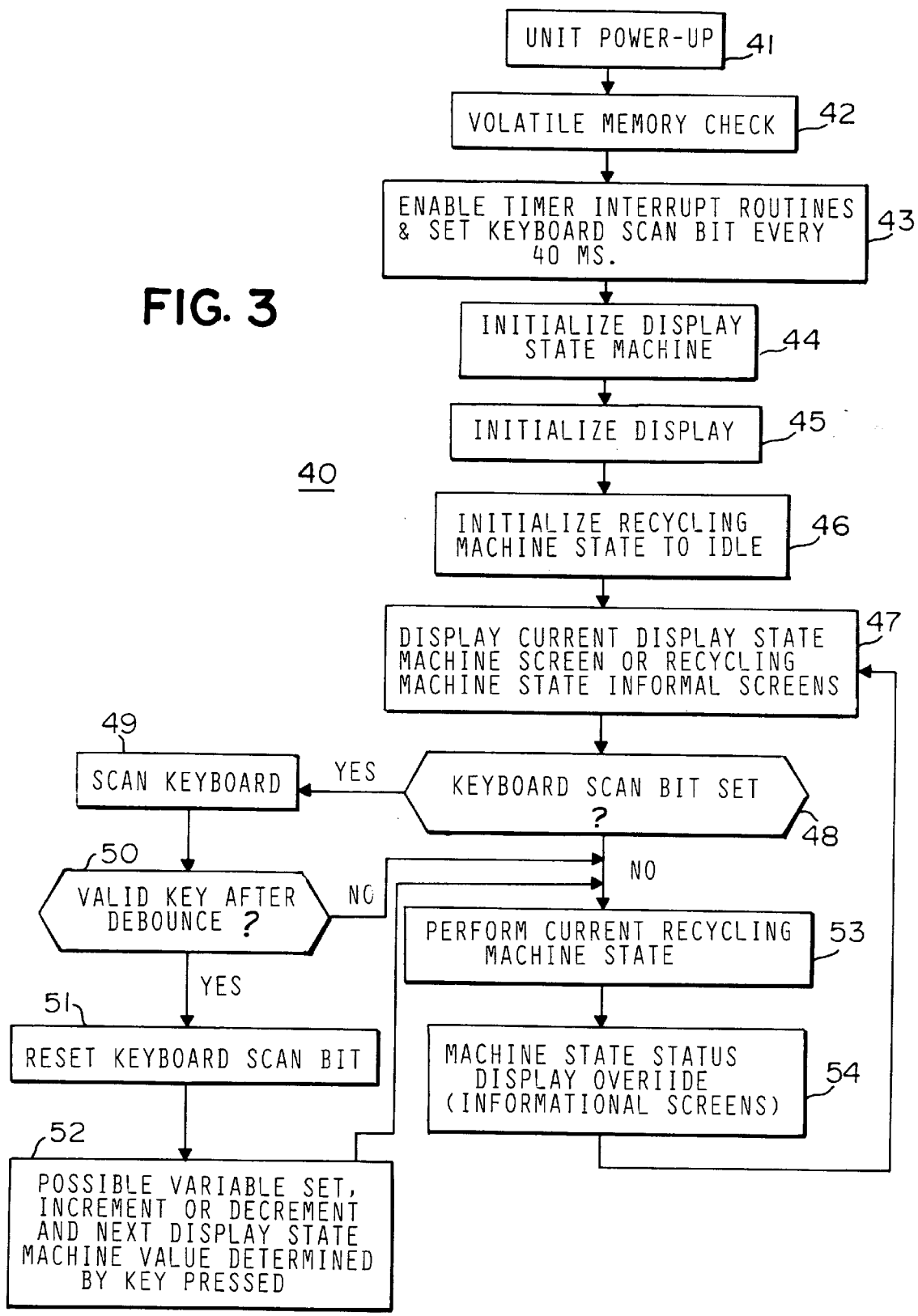
FIG. 3 is a flow diagram of the microprocessor program for controlling the display of the refrigerant handling system of FIG. 1.

Referring to FIG. 3, there is illustrated a flow chart 40 of the software program for controlling the display unit 21. Initially, the unit is powered up at 41 and a volatile memory check is performed at 42, and then, at 43, the timer interrupt routines are enabled which allow the keyboard scan bit to be periodically set, such as every 40 ms. Next, the display state machine in software is initialized to the opening display state at 44, then the display unit 21 itself is initialized at 45, and next the state of the software recycling machine is initialized to the idle state, at 46. Next, at 47, the display screen 23 is caused to display either the current display state or an informational screen regarding the recycling state if the system 10 is in a recycling mode. Then, at 48, the program asks if the keyboard scan bit has been set. If it has, the keyboard is scanned at 49 and the program then checks at 50 to see if a valid key depression after debounce has been detected. If it has, then at 51 the keyboard scan bit is reset. Then, at 52, a possible variable is set, incremented or decremented, or the next value of the display state machine is determined, depending upon the key pressed and the system state when it was pressed. Then the program proceeds to 53 to perform the current recycling machine state and then, at 54 the recycling machine state status display is caused to override the recycling machine informational screens before returning to block 47. If, at 48, the keyboard scan bit was not set, the program proceeds immediately to block 53 to perform the current recycling machine state.

From the foregoing, it can be seen that there has been provided an improved refrigerant handling system and user interface therefor, which permits the use of an inexpensive text-based display unit in an interactive display utilizing soft keys.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A user interface for refrigerant handling apparatus adapted for use with a vehicle air conditioning system and including a microprocessor-based control circuit operable under stored program control, said user interface comprising:

a text-based display screen having plural character blocks for respectively displaying only single characters, selective input keys including plural software-definable keys respectively associated with different regions of said display screen, and a memory coupled to the control circuit for cooperation therewith to control the display of messages on said display screen and to define the functions performed by said software-definable keys in accordance with messages displayed in the corresponding regions of said display screen.

2. The user interface of claim 1, wherein each of said character blocks includes a plurality of pixels arranged in a grid.

3. The user interface of claim 1, wherein each of said regions includes a plurality of character blocks.

4. The user interface of claim 1, wherein said software-definable keys are three in number.

5. The user interface of claim 1, wherein said selective input keys include fixed-function keys.

6. The user interface of claim 1, wherein said software-definable keys are respectively disposed adjacent to the corresponding regions of said display screen.

7. The user interface of claim 1, and further comprising a bezel surrounding said display screen and disposed between said display screen and said software-definable keys, said bezel having formed thereon indicia respectively extending from each of said software-definable keys to its corresponding display screen region.

8. The user interface of claim 1, wherein said display screen is dimensioned and arranged for displaying four horizontal rows containing twenty character blocks each.

9. Refrigerant handling apparatus for use with a refrigeration unit, said apparatus comprising:

refrigerant containing structure for receiving refrigerant from and supplying refrigerant to the refrigeration unit, fluid flow control mechanism coupled between the refrigeration unit and said containing structure for controlling flow of refrigerant therebetween, a microprocessor-based control circuit coupled to said control mechanism and operating under stored program control to control the operation of said flow control mechanism, a text-based display screen coupled to said control circuit and having plural character blocks for respectively displaying only single characters, selective input keys coupled to said control circuit and including plural software-definable keys respectively associated with different regions of said display screen, and a memory coupled to said control circuit for cooperation therewith to control the display of messages on said display screen and to define the functions performed by said software-definable keys in accordance with messages displayed in the corresponding regions of said display screen.

10. The apparatus of claim 9, wherein each of said character blocks includes a plurality of pixels arranged in a grid.

11. The apparatus of claim 9, wherein each of said regions includes a plurality of character blocks.

12. The apparatus of claim 9, wherein said software-definable keys are three in number.

13. The apparatus of claim 9, wherein said selective input keys include fixed-function keys.

14. The apparatus of claim 9, wherein said software-definable keys are respectively disposed adjacent to the corresponding regions of said display screen.

15. The apparatus of claim 9, and further comprising a bezel surrounding said display screen and disposed between said display screen and said software-definable keys, said bezel having formed thereon indicia respectively extending from each of said software-definable keys to its corresponding display screen region.

16. The apparatus of claim 9, wherein said display screen is dimensioned and arranged for displaying four horizontal rows containing twenty character blocks each.

\* \* \* \* \*